United States Patent
Schrepfer et al.

(10) Patent No.: US 8,483,855 B2
(45) Date of Patent: Jul. 9, 2013

(54) METHOD AND DEVICE FOR THE PLAYBACK OF DIGITAL AUDIO SIGNALS

(75) Inventors: Jorg Schrepfer, Tettau (DE); Alexander Mainz, Kronach (DE); Manfred Neumann, Kueps (DE)

(73) Assignee: Lear Corporation, Southfield, MI (US)

( * ) Notice: Subject to any disclaimer, the term of this patent is extended or adjusted under 35 U.S.C. 154(b) by 726 days.

(21) Appl. No.: 12/725,639

(22) Filed: Mar. 17, 2010

(65) Prior Publication Data

US 2010/0280640 A1    Nov. 4, 2010

(30) Foreign Application Priority Data

Apr. 30, 2009   (DE) .......................... 10 2009 003 851

(51) Int. Cl.
*G06F 17/00* (2006.01)
(52) U.S. Cl.
USPC ............................................................ 700/94
(58) Field of Classification Search
USPC ..... 700/94; 370/463, 421, 220, 391; 348/500, 348/484
See application file for complete search history.

(56) References Cited

U.S. PATENT DOCUMENTS

| 5,287,182 A | 2/1994 | Haskell et al. |
| 5,426,635 A | 6/1995 | Mitra et al. |
| 5,933,430 A | 8/1999 | Osakabe et al. |

FOREIGN PATENT DOCUMENTS

DE        19723760 B4    12/1998

*Primary Examiner* — Andrew C Flanders
(74) *Attorney, Agent, or Firm* — MacMillan, Sobanski & Todd, LLC

(57) ABSTRACT

A method and a device for the playback of digitalized audio signals that are transmitted packet-oriented from a signal source to at least one signal sink, especially a loudspeaker unit, in a motor vehicle by means of an asynchronous bus system. Connected upstream of the signal sink is an audio-signal processing unit demonstrating a data rate converter, which is fed the digitalized audio signals destined for the signal sink from a control unit over a data line by means of a first data interface of the control unit. The control unit has a second data interface for the connection to the asynchronous bus system and for receiving the digitalized audio signals. A data buffer and a controller are arranged within the control unit. A first and second clocking signal provide the clock rates for the first interface and the data rate converter. These clock rates can be changed by a logic unit.

13 Claims, 2 Drawing Sheets

METHOD AND DEVICE FOR THE PLAYBACK OF DIGITAL AUDIO SIGNALS

CROSS-REFERENCE TO RELATED APPLICATIONS

This application claims the benefit of German Patent Application No. 102009003851.5, filed Apr. 30, 2009, the disclosure of which is incorporated herein by reference.

BACKGROUND OF THE INVENTION

The present invention relates to a method and a device, especially in a motor vehicle, for the playback of digital audio signals that are transmitted over an asynchronous digital bus system.

In the transmission of digital audio signals over a digital asynchronous bus system, it must be taken into consideration that the digitalized audio signals are not transmitted continuously at constant time intervals and readily available on the bus, but rather that some digital audio signals arrive at the signal sink with substantial time delay. For data transmission in an asynchronous digital bus system, it is therefore necessary to make special provisions so that these data can nevertheless be continuously outputted to a user.

The transmission of data over a synchronous data network is known from EP 0577329 A2. In this case, the playback speed is continuously adjusted to the data rate of the data transmission.

A synchronizing of simultaneously transmitted data, preferably audio data, is known from DE 69634891 T2.

A time alignment of data that are transmitted over a data network is known from DE 69426350 T2.

A device for receiving data, especially audio and video data, which are transmitted by means of an asynchronous data transmission technique wherein the device is fed a clocking signal, is known from DE 19723760 A1. It provides for a storage device that temporarily stores the received data over a time interval needed to compensate for transmission delays. This invention is characterized in that the clocking signal is fed to the storage device for the purpose of reading the data. The invention furthermore relates to a method for transmitting and receiving data signals by means of an asynchronous data transmission technique, wherein the received data signals are temporarily stored and are read at the studio clock rate.

A disadvantage in the above prior art, however, is that a memory space of large dimension must be present to provide for sufficient intermediate storage of the data in order to compensate for the time delays. A reduction of this memory is not provided and can as yet not be implemented without substantial extra cost.

Various aspects of this invention will become apparent to those skilled in the art from the following detailed description of the preferred embodiment, when read in light of the accompanying drawings.

SUMMARY OF THE INVENTION

The object of the present invention is to avoid the above-mentioned problems and to temporarily store audio data, especially music data, which are transmitted in an asynchronous digital bus system, by means of a temporary memory that is dimensioned as small as possible to compensate for the system-related delays in data transmission. For use in a motor vehicle, it should also make it possible to output through the signal sink additional or other audio data that have a higher priority than the music data to be played back.

This object is achieved by continuously adjusting the data rates and the speed of the data processing so that the temporary memory does not overflow.

This object is achieved on the basis of the characteristics of claims 1 and 6. Advantageous embodiments of the invention are apparent from the dependent claims, the further description and on the basis of a concrete embodiment example.

The method according to the invention provides for the playback of digitalized audio signals that are transmitted packet-oriented from a signal source to at least one signal sink, especially a loudspeaker unit, in a motor vehicle by means of an asynchronous bus system. An audio-signal processing unit with a data rate converter is connected upstream of the signal sink. The data rate converter receives the digitalized audio signals destined for the signal sink from a control unit over a data line that is fed by a first data interface of the control unit. The control unit has a second data interface for the connection to the asynchronous bus system and for receiving the digitalized audio signals. A data buffer and a controller are arranged within the control unit, wherein the controller outputs a control signal to an oscillator interfaced to a logic unit. The logic unit generates at least a first and a second clocking signal based on a clocking signal generated by the oscillator, the first clocking signal being fed to the first data interface and the second clocking signal being fed to the data rate converter. The controller changes the clocking signal through its control signal, causing the logic unit to change the clocking rates of the first and second clocking signal, which provide the clocking rates for the first interface and the data rate converter, so that the data rate at which the first interface reads the data from the data buffer and at which data are transmitted to the data rate converter of the audio signal processing unit over the data line, and the data rate of the data rate converter, are controlled by the controller as a function of the filling level of the data buffer.

In another embodiment, it is advantageous that a third clocking signal, which is derived from the asynchronous bus system or from the control unit or from the first clocking signal or from the second clocking signal or from another clocking signal, triggers the audio signal processing unit. This allows the audio signal processing unit to be operated at a clocking rate different from that of the remaining components. In addition, it is also possible to operate the data rate converter and the audio signal processing unit at different clocking rates.

In another embodiment, it is preferred that a voltage-controlled oscillator is used as oscillator.

In another embodiment, it is preferred that the control signal is a direct voltage signal, the voltage level of which is varied by the controller.

In another embodiment, it is preferred that the controller is an embedded software program that is implemented in the control unit.

The method according to the invention is used for the playback of digitalized audio signals that are interfaced to an asynchronous bus system in a motor vehicle in order to transmit packet-oriented data from a signal source to at least one connected signal sink, especially a loudspeaker unit. It comprises an audio signal processing unit and a data rate converter, which are upstream of the connected signal sink. The data rate converter is connected to a first data interface of the control unit over a data line. The control unit comprises a second data interface for the connection to the asynchronous bus system and for receiving digitalized audio signals. A data buffer and a controller are arranged in the control unit, wherein by means of a control signal, the controller controls an oscillator that generates a clocking signal as output signal. The clocking signal serves as input signal to a logic unit. The logic unit generates at least a first and a second clocking signal, the first clocking signal serving the first data interface and the second clocking signal serving the data rate converter in order to control their processing speed, so that the processing speed at which the first interface reads the data from the data buffer and transmits to the data rate converter of the audio signal processing unit over the data line, and the processing speed of the data rate converter, can be controlled as a function of the filling level of the data buffer.

In another embodiment, it is preferred that a third clocking signal, which is derived from the asynchronous bus system or from the control unit or from the first clocking signal or from the second clocking signal or from another clocking signal or which originates from the logic unit, triggers the audio signal processing unit.

In another embodiment, it is preferred that the oscillator is a voltage-controlled oscillator.

In another embodiment, it is preferred that the control signal is a direct voltage signal, the voltage level of which can be varied by the controller.

In another embodiment, it is preferred that the controller is a software that is embedded in the control unit.

In another embodiment, it is preferred that the data rate converter is a software that is embedded in the audio signal processing unit.

In another embodiment, it is preferred that the audio signal processing unit is a microcomputer unit, a microcomputer, a microcontroller or a microcontroller unit or a digital signal processor or a digital signal processor unit.

In another embodiment, it is preferred that the control unit is a microcomputer unit, a microcomputer, a microcontroller or a microcontroller unit.

In the following, the invention will be described on the basis of a concrete embodiment example on the basis of two figures. The description of the invention on the basis of a concrete embodiment example does not represent any restriction or limitation of the invention to this concrete embodiment.

DETAILED DESCRIPTION OF THE PREFERRED EMBODIMENT

Figure 1:
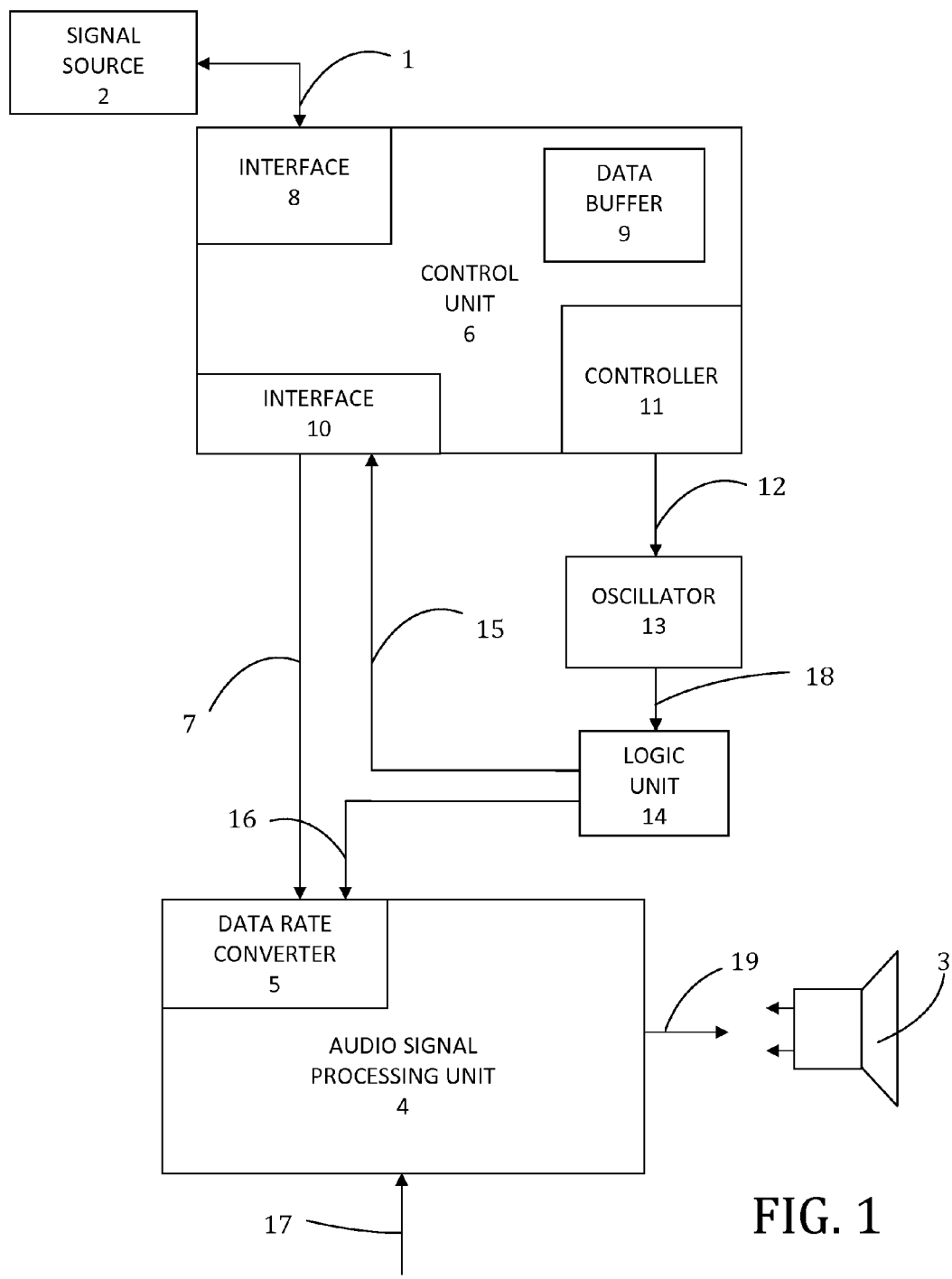
FIG. 1 is a schematic construction of a device according to the invention in the form of a block diagram.

In the following description of the figures, the same reference characters for identical elements in the figures will be used throughout all of the figures. This will provide clarity and better understanding of the following concrete description of the invention based on FIG. 1 and FIG. 2.

FIG. 1 represents a schematic construction of a device according to the invention in the form of a block diagram. It represents an asynchronous data bus 1. The asynchronous data bus 1 is arranged, for example, in a motor vehicle. Digitalized data, e.g. audio data, video data or other data, are transmitted packet-oriented over the asynchronous data bus 1. At least one signal source 2 and at least one signal sink 3 are connected to the asynchronous data bus 1. The signal sinks and signal sources each have electrical and/or electronic components to communicate with the asynchronous data bus 1 and to send and/or receive data over same. In the concrete embodiment example, a signal source 2, which transmits audio data to the asynchronous data bus 1, is interfaced over the asynchronous data bus 1. The embodiment example relates to a radio signal receiver unit which receives radio signals and transmits the audio signals and music data contained in the radio signal over the asynchronous data bus 1 to at least one signal sink 3. But the signal source 2 can also relate to another type of signal source, such as a DVD unit, a hands free phone or a park-distance unit that uses sensors to detect the distance to nearby objects and releases an acoustic warning as soon as a presettable distance to an object is exceeded.

Any signal source which is interfaced to asynchronous data bus 1 is equipped with a defined address. Each data packet that is sent over the asynchronous data bus 1 has a header, which is usually located at the beginning of the data packet and contains the address of the signal source from which the data packet originates. Furthermore, the signal sink for which the data packet is destined can be entered into the header. In this way, only those signal sinks for which the data packet is destined will take the data packets from asynchronous data bus 1. A priority for the signal sources from which the data packet originates can also be entered into the header. The signal sink will then first process those data with higher priority and output them as necessary.

In accordance with the embodiment example, a control unit 6 is interfaced with the asynchronous data bus 1. The control unit 6 demonstrates an interface 8. The interface 8 is provided to interface control unit 6 with the asynchronous data bus 1. In an advantageous embodiment of the invention, this interface relates to a gateway or a specially designed interface for adapting an asynchronous data bus. Moreover, the control unit 6 demonstrates a data buffer 9.

From the asynchronous data bus 1, control unit 6 accepts only those data packets that are addressed to the signal sink 3, which is connected to control unit 6. In the present concrete embodiment example, this relates to signal sink 3, which is a loudspeaker unit and which control unit 6 supplies with audio data to be outputted.

Data buffer 9 within the control unit 6 provides for temporary storage of data that control unit 6 receives over interface 8. Furthermore, another interface 10 is present. This interface 10 preferably relates to a data interface, which preferably outputs audio data. This interface 10 is triggered by control unit 6. Control unit 6 determines the audio data present in data buffer 9 and passes these to interface 10, which transmits these audio data to another unit over data line 7.

But control unit 6 releases these data over interface 10 as a function of their priorities. Data having higher priority are handed over first.

Moreover, a controller 11 is arranged within control unit 6. Controller 11 generates a control signal 12. Controller 11 outputs the control signal 12 to an external unit.

Control unit 6 preferably relates to a microcontroller, a microcontroller unit, a microcomputer or a microcomputer unit. In an advantageous embodiment of the invention, control unit 6 is built modular so that it is appropriately expandable so that if other interfaces, especially audio data interfaces similar to interface 10, are present, then other signal sinks can be connected via control unit 6. A control unit 6 can thus supply a plurality of signal sinks with corresponding data.

In an advantageous embodiment, controller 11 can be implemented as a software routine in control unit 6. It is thus possible to save the cost of implementing it as a separate hardware embodiment. In the case of the software embodiment, this can for example be an embedded software that is integrated into control unit 6.

The interface 10 of the control unit 6, as already explained, conducts the audio data to an external unit over data line 7. In a preferred embodiment, the external unit relates to an audio signal processing unit 4. In an advantageous embodiment of the invention, the audio signal processing unit 4 relates to a digital signal processor, a digital/analog converter, a codec or coder or a combination of same. A signal sink 3 is connected to the audio signal processing unit 4 over the line 19. The signal sink 3 relates, for example, to at least one loudspeaker. Analog data are outputted to the signal sink 3 over line 19. Moreover, an amplifier, which amplifies the analog audio data before they are conducted to signal sink 3, is arranged in the audio signal processing unit 4. The digital audio data are fed to the audio signal processing unit 4 over the data line 7. They are received by a data rate converter 5. The data rate converter 5 converts the digital audio signals, which are transmitted over data line 7 at the cycle of the clocking signal 16, to the clock rate of the audio signal processing unit 4. The audio signal processing unit 4 and a digital-analog converter unit not illustrated in FIG. 1 process the digital audio signals at a sampling rate derived from the cycle of clocking signal 17. The audio signals, which are now present in analog form, are then outputted over the signal sink 3. The clocking signals 16 and 17 can be completely asynchronous to one another by using the data rate converter 5.

In an advantageous embodiment of the invention, the data rate converter 5 is integrated into the audio signal processing unit 4 as embedded software.

Controller 11 of control unit 6 outputs the control signal 12. In a preferred embodiment, a control signal 12 relates to a voltage signal, preferably a direct voltage signal. In a preferred embodiment, controller 11 utilizes a port of control unit 6 for this and outputs the control signal 12 to it. This control signal 12 is fed to an oscillator 13. In a preferred embodiment, the oscillator 13 relates to a voltage controlled oscillator. The frequency of oscillator 13 is varied as a function of the voltage level of control signal 12. Oscillator 13 generates a clocking signal 18, which is conducted to logic unit 14 and can be varied by control signal 12.

Logic unit 14 generates two other clocking signals 15 and 16 based on clocking signal 18. Clocking signal 15 is fed to the first interface 10 of control unit 6. The second clocking signal 16 is fed to the data converter 5 of the audio signal processing unit 4. Clocking signal 15 controls the data rate at which the first interface gives the digital audio data to the data line 7 and at what speed or data rate the data are read from data buffer 9. The clocking signal 16 controls the speed at which the data rate converter 5 receives and further processes the data from data line 7. As previously described, logic unit 14 controls the clocking signals 15 and 16 based on clocking signal 18. Controller 11 generates control signal 12 as a function of the utilization level of data buffer 9 and the speed of filling and emptying data buffer 9. As described above, control unit 6 places the data received from asynchronous data bus 1, audio data in the embodiment example, into data buffer 9, from which they are read and sent to interface 10 for transmission, to audio signal processing unit 4. The reading from data buffer 9 is performed either by control unit 6 or, in another preferred embodiment of the invention, independently by interface 10 in a manner controlled by clocking signal 15. At the same time, however, on the receiving side, say data rate converter 5, the speed must be adjusted to that of the interface 10.

To henceforth prevent an overflow of data buffer 9 or an emptying of data buffer 9, it is necessary to correspondingly adjust the both the processing speed in control unit 6 and the download speed of the data rate converter 5. The described variation of clock rates of clocking signals 15 and 16 serves this purpose.

Control unit 11 accelerates the clocking signals 15, 16 and 18 when the data buffer 9 is being filled faster than it is being emptied to the audio signal processing unit 4 by the first interface 10. Control unit 11 slows the clocking signals 15, 16 and 18 when data buffer 9 is being filling more slowly than it is being emptied to the audio signal processing unit 4 by the first interface 10. The utilization level of data buffer 9 is determined and/or averaged over a relatively long period. This is preferably accomplished by control unit 6 or by controller 11. This averaging of the utilization level of data buffer 9 over a long time interval corresponds to low-pass filtering. This low-pass filtered signal is then used as input signal to the control system of oscillator 13, preferably controller 11. The clock rates of clocking signals 15, 16 and 17 therefore change relatively slow. Slow changes of the clock rates are frequently called "clock wander" and rapid changes of the clock rates are frequently call "jitter." If an audio or video playback system or a device for playback of digital and/or video signals is 'operated with a wandering clock signal (i.e. with clock wander), this will result in changes in pitch in the playback, the difference between maximum and minimum clock rate must only be sufficiently large. The low-pass filtering must therefore limit this by minimizing the amount of "clock wander" and also the rate of change of the clock frequency. The changes in pitch during playback are significantly reduced when the clocking signal 17 is constant, e.g. by using a quartz oscillator. Since the two clocking domains for the clocking signal 15/16 and the clocking signal 17 are asynchronous, it is necessary to use a data rate converter 5.

The data rate converter 5 separates the clock rates of data transmission between the clocking signals 15/16 and 17, since these can fluctuate relative to one another. According to the invention, it has been shown that fluctuations of up to ten percent can occur. These should be stopped if possible.

In an advantageous embodiment of the invention, the clocking signal 17, with which data are further processed in the data audio signal processing unit 4 and outputted, has a fixed frequency. The adjustment of the variable data rate from the cycle 16 and the fixed data rate 17 occurs in the data rate converter 5.

Figure 2:
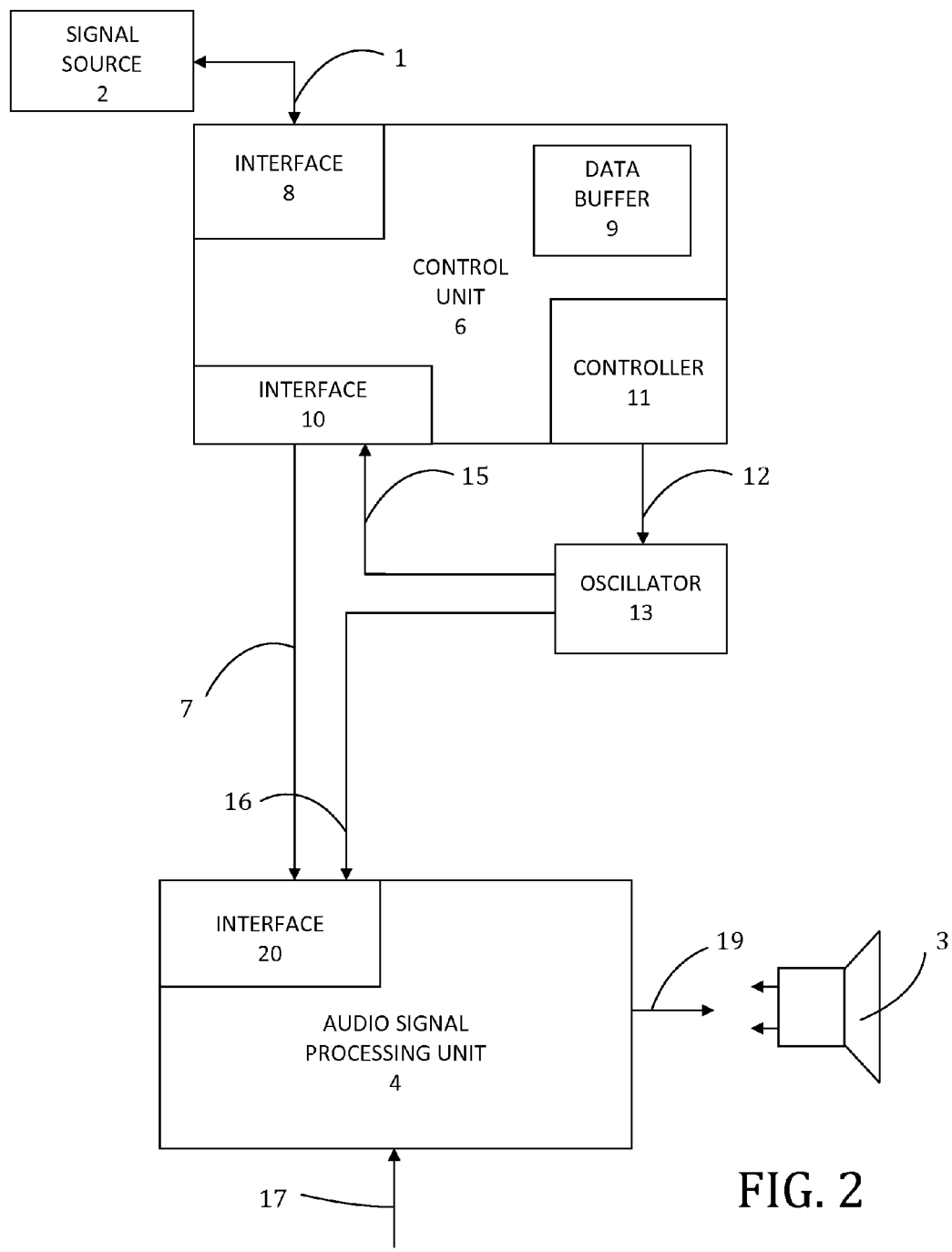
FIG. 2 is another schematic construction of a device according to the invention in the form of a block diagram.

In another embodiment of the invention as per FIG. 2, all clocking signals 15, 16, 17 and 18 are based on a common base signal, namely that of oscillator 13. Since the processing and output speed of the audio signal processing unit 4 always changes in this case, it is possible to dispense with a data rate converter 5. In the embodiment of the invention as per FIG. 2, the data rate converter 5 of FIG. 1 is replaced by an interface 20, which is controlled with the clocking signal 16.

In another embodiment of the invention, the clocking signal 15, 16, 17 can be replaced by a single clocking signal that is generated by oscillator 13. In this case, it is possible to dispense with the logic unit 14, because the oscillator 13 then delivers the clocking signal directly. In this case it is necessary to take into consideration, however, that the oscillator 13 must then be designed to generate a correspondingly necessary clocking signal in a stable manner.

The principle and mode of operation of this invention have been explained and illustrated in its preferred embodiment. However, it must be understood that this invention may be practiced otherwise than as specifically explained and illustrated without departing from its spirit or scope.

What is claimed is:

1. Method for the playback of digitalized audio signals that are transmitted packet-oriented from a signal source to at least one signal sink in a motor vehicle by means of an asynchronous bus system, wherein connected upstream of the signal sink is an audio-signal processing unit demonstrating a data rate converter, which is fed the digitalized audio signals destined for the signal sink from a control unit over a data line by means of a first data interface of the control unit, the control unit has a second data interface for the connection to the asynchronous bus system and for receiving the digitalized audio signals, a data buffer and a controller are arranged within the control unit, wherein the controller outputs a control signal to an oscillator interfaced to a logic unit, and the logic unit generates at least a first and a second clocking signal based on a clocking signal generated by the oscillator, the first clocking signal being fed to the first data interface and the second clocking signal being fed to the data rate converter, and the controller changes the clocking signal through the control signal, causing the logic unit to change the clocking rates of the first and second clocking signal, which provide the clocking rates for the first interface and the data rate converter, so that the data rate at which the first interface reads the data from the data buffer and at which data are transmitted to the data rate converter of the audio signal processing unit over the data line, and the data rate of the data rate converter, are controlled by the controller as a function of the filling level of the data buffer.

2. Method according to claim 1, characterized in that a third clocking signal, which is derived from the asynchronous bus system or from the control unit or from the first clocking signal or from the second clocking signal or from another clocking signal or from a fixed clocking signal, originating from a quartz oscillator, triggers the audio signal processing unit.

3. Method according to claim 1, characterized in that a voltage-controlled oscillator is used as oscillator.

4. Method according to claim 1, characterized in that the control signal is a direct voltage signal, the voltage level of which is varied by the controller.

5. Method according to claim 1, characterized in that the controller is an embedded software program that is implemented in the control unit.

6. Device for the playback of digitalized audio signals that are interfaced to an asynchronous bus system in a motor vehicle in order to transmit packet-oriented data from a signal source to at least one connected signal sink comprising an audio signal processing unit, which demonstrates a data rate converter and is upstream of the connected signal sink, and the data rate converter is connected to a first data interface of the control unit over a data line, the control Lout comprises a second data interface for the connection to the asynchronous bus system and for receiving digitalized audio signals, a data buffer and a controller are arranged in the control unit, wherein by means of a control signal, the controller controls an oscillator that generates a clocking signal as output signal that serves as input signal to a logic unit, and the logic unit generates at least a first and a second clocking signal, the first clocking signal serving the first data interface and the second clocking signal serving the data rate converter in order to control their processing speed, so that the processing speed at which the first interface reads the data from the data buffer and transmits to the data rate converter of the audio signal processing unit over the data line, and the processing speed of the data rate converter, can be controlled as a function of the filling level of the data buffer.

7. Device according to claim 6, characterized in that a third clocking signal, which is derived from the asynchronous bus system or from the control unit or from the first clocking signal or from the second clocking signal or from another clocking signal or from a fixed clocking signal, originating from a quartz oscillator, or which originates from the logic unit, triggers the audio signal processing unit.

8. Device according to claim 6, characterized in that the oscillator is a voltage-controlled oscillator.

9. Device according to claim 6, characterized in that the control signal is a direct voltage signal, the voltage level of which can be varied by the controller.

10. Device according to claim 6, characterized in that the controller is a software that is embedded in the control unit.

11. Device according to claim 1, characterized in that the data rate converter is a software that is embedded in the audio signal processing unit.

12. Device according to claim 1, characterized in that the audio signal processing unit is a microcomputer unit, a microcomputer, a microcontroller or a microcontroller unit or a digital signal processor or a digital signal processor unit.

13. Device according to claim 1, characterized in that the control unit is a microcomputer unit, a microcomputer, a microcontroller or a microcontroller unit.

* * * * *